United States Patent
Pyron

(10) Patent No.: US 7,404,244 B2
(45) Date of Patent: Jul. 29, 2008

(54) CONVERTING TWIST-LOCK TUBE SHEET FILTER ORIFICES TO SNAP-BAND ORIFICES

(76) Inventor: Donald R. Pyron, 1000 S. Broadway, Smackover, AR (US) 71762

( * ) Notice: Subject to any disclaimer, the term of this patent is extended or adjusted under 35 U.S.C. 154(b) by 205 days.

(21) Appl. No.: 11/204,319

(22) Filed: Aug. 15, 2005

(65) Prior Publication Data

US 2006/0037474 A1    Feb. 23, 2006

Related U.S. Application Data

(60) Provisional application No. 60/603,681, filed on Aug. 23, 2004.

(51) Int. Cl.
 *B21C 37/06* (2006.01)
 *B23P 23/00* (2006.01)
(52) U.S. Cl. .................................. 29/33 D; 29/33 R
(58) Field of Classification Search .................. 29/33 D, 29/33 R, 563; 407/113, 114, 115, 116, 117
See application file for complete search history.

(56) References Cited

U.S. PATENT DOCUMENTS

| | | | |
|---|---|---|---|
| 1,036,748 A | 8/1912 | Tobey | |
| 1,598,887 A | 6/1926 | Smith | |
| 1,838,011 A | 12/1931 | Peter | |
| 3,069,761 A | 12/1962 | Sommer | |
| 3,236,723 A | 2/1966 | Whiteside | |
| 3,245,302 A | 4/1966 | Bayley | |
| 3,245,868 A | 4/1966 | Espenmiller et al. | |
| 3,579,788 A | 5/1971 | Johnson | |
| 3,689,978 A | 9/1972 | Kelso | |
| 3,706,123 A | 12/1972 | Whitledge | |
| 3,908,258 A | 9/1975 | Barty | |
| 4,073,632 A | 2/1978 | Reinauer et al. | |
| 4,113,449 A | 9/1978 | Bundy | |
| 4,141,128 A | 2/1979 | Wonderling | |
| 4,152,958 A | 5/1979 | Bogert | |
| 4,157,901 A | 6/1979 | Schaltenbrand | |
| 4,194,894 A | 3/1980 | Noland | |
| 4,257,790 A | 3/1981 | Bergquist et al. | |
| 4,276,765 A | 7/1981 | Yoneda | |
| 4,277,874 A | 7/1981 | Brown et al. | |
| 4,303,425 A | 12/1981 | Cox, Jr. | |
| 4,328,608 A | 5/1982 | Gibson | |
| 4,418,458 A | 12/1983 | Hunter | |
| 4,424,070 A | 1/1984 | Robinson | |
| 4,435,197 A | 3/1984 | Nijhawan et al. | |
| 4,506,575 A | 3/1985 | McCay et al. | |
| 4,535,822 A | 8/1985 | Rogers, Jr. | |
| 4,595,402 A | 6/1986 | Silletto et al. | |
| 4,611,516 A * | 9/1986 | Hochmuth et al. | ............ 82/1.2 |
| 4,618,353 A | 10/1986 | Reier | |
| 4,686,877 A | 8/1987 | Jaritz et al. | |
| 4,864,906 A | 9/1989 | Hall | |
| 4,906,334 A | 3/1990 | Evens | |
| 4,941,380 A | 7/1990 | Lockwood | |

(Continued)

*Primary Examiner*—Dana Ross
(74) *Attorney, Agent, or Firm*—Stephen D. Carver

(57) ABSTRACT

Embodiments include a method and apparatus for converting one or more twist-lock orifices of a tube sheet of a baghouse filter system to one or more snap-band orifices. In one embodiment, a machine is utilized to remove one or more tabs from a twist-lock orifice by use of a cutting tool, thereby converting the twist-lock orifice to a snap-band orifice.

5 Claims, 6 Drawing Sheets

U.S. PATENT DOCUMENTS

| | | | |
|---|---|---|---|
| 5,017,200 A | 5/1991 | Price et al. | |
| 5,061,303 A | 10/1991 | Williams et al. | |
| 5,202,021 A | 4/1993 | Griffin et al. | |
| 5,233,740 A | 8/1993 | Chen | |
| 5,290,441 A | 3/1994 | Griffin et al. | |
| 5,308,369 A | 5/1994 | Morton et al. | |
| 5,308,485 A | 5/1994 | Griffin et al. | |
| 5,398,386 A | 3/1995 | Pyron et al. | |
| 5,421,845 A | 6/1995 | Baxter et al. | |
| 5,593,253 A * | 1/1997 | Pozzo | 407/36 |
| 5,636,422 A | 6/1997 | Pyron et al. | |
| 5,659,938 A | 8/1997 | Pyron et al. | |
| 5,704,591 A | 1/1998 | Byrne | |
| 5,759,350 A | 6/1998 | Pyron et al. | |
| 5,904,743 A * | 5/1999 | Jensen | 55/341.1 |
| 5,913,957 A | 6/1999 | Pyron et al. | |
| 5,921,730 A * | 7/1999 | Young et al. | 409/182 |
| 5,966,793 A | 10/1999 | Pyron | |
| 6,001,145 A | 12/1999 | Hammes | |
| 6,045,306 A * | 4/2000 | Buddendeck et al. | 409/182 |
| 6,146,476 A * | 11/2000 | Boyer | 148/525 |
| 6,244,797 B1 * | 6/2001 | Wheeler | 409/182 |
| 6,293,320 B1 * | 9/2001 | McGregor, II | 144/1.1 |
| 6,375,698 B1 | 4/2002 | Clements et al. | |
| 6,402,438 B1 * | 6/2002 | Boyer | 408/144 |
| 6,561,238 B2 * | 5/2003 | Knighten | 144/385 |
| 6,626,970 B2 | 9/2003 | Pipkorn et al. | |
| 6,726,735 B1 * | 4/2004 | Oussoren et al. | 55/377 |
| 6,745,841 B2 * | 6/2004 | Abercrombie Simpson | 166/380 |
| 6,811,362 B2 * | 11/2004 | Wallin et al. | 409/138 |
| 2002/0043293 A1 * | 4/2002 | Knighten | 144/2.1 |
| 2002/0046632 A1 * | 4/2002 | Wallin et al. | 82/1.11 |

* cited by examiner

CONVERTING TWIST-LOCK TUBE SHEET FILTER ORIFICES TO SNAP-BAND ORIFICES

CROSS-REFERENCE TO RELATED APPLICATIONS

This application claims benefit of U.S. provisional patent application Ser. No. 60/603,681, filed Aug. 23, 2004, which is herein incorporated by reference in its entirety.

BACKGROUND OF THE INVENTION

1. Field of the Invention

Embodiments of the present invention generally relate to baghouse filter systems and the tube sheets used thereby. More particularly, embodiments of the present invention relate to the orifices within tube sheets of baghouse filter systems.

2. Description of the Related Art

Commercial baghouses of various configurations, including pulse jet, reverse air, and shaker baghouse designs, are used for removing gas-borne particulates generated in various manufacturing or industrial processes. Reverse air baghouse filter installations, operating either under positive or negative pressure configurations, are typically utilized in steel mills, cement, and limestone plants, as well as in other installations where dust collection is mandated to control air pollution.

Reverse air baghouses include numerous separately suspended filters establishing a gas or air flow passageway between an inlet volume which receives dirty gas to be filtered and a vented outlet volume for exhausting cleaner, filtered air or gas. Particulates borne by the entering gas stream are trapped and captivated by the filter bodies of the filters.

Numerous baghouse and baghouse filter designs are known. In some baghouse designs, multiple, tube-like fabric filter bags hung from J-hooks in an upper plenum provide a gas or air flow path trap to the vent system. The lower ends of the bag filters are coupled to various collars in a tube sheet floor, and gas enters the tubes through the collars.

Most baghouse filter designs include some form of header plate or cell plate, often referred to as a tube sheet, that divides and separates adjacent baghouse volumes. The tube sheet typically includes multiple circular orifices therethrough. The purpose of the tube sheet is to direct the gas flow to the inside of the filter bag via the orifices within the tube sheet, thus forcing the gas to pass through the fabric body of the filter bag.

Typically, the filter tubes are oriented vertically with respect to the air plenum. Suitable collars or attachment fixtures are coaxially associated with the orifices located in the headers or tube sheets. Various mechanical means are utilized for attaching the filter bags to the orifices; for example, with pulse jet designs, an open end of each filter bag may be attached to a venturi or collar which is fitted to each orifice. The filter bag may be attached to the venturi with a conventional encircling clamp or band and then secured to the orifice by a twist-lock design. Other attachment techniques include double-beaded snap bands and single snap bands.

Filter bags are available in several different lengths and diameters and may measure upwardly from approximately four inches in diameter and lengthwise may measure up to approximately forty feet. Given the high working temperatures to which some filters are subjected, and the various pressure-generated forces encountered during operation, some means must be provide for preventing the bags from totally collapsing during cleaning cycles. Thus, bags may be reinforced by wire cages placed within the filter bags subsequent to their hanging.

Many filter bags have tube-like, fabric exteriors that surround an inner, rigid skeleton composed of wire or metal. A secure and reliable connection prevents particulate waste from escaping the baghouse chamber.

Some designs use a rigid, self-supporting fabric. Filters having fabric formed over rigid frames are commercially known as "cartridges." These designs are capable of collecting particulates on the outside of the fabric. Typical filter cartridges have an inner, perforated tubular sleeve coaxially surrounded by an annular filter, often comprising a resin-impregnated fabric or filter. Alternatively, air filter bags may be reinforced by a series of concentric, spaced-apart reinforcing rings disposed within their length.

Many baghouse filter systems employ tube sheets designed for twist-lock filters, the tube sheets having tabbed orifices therein which include a plurality of rigid, radially spaced apart tabs. Filter bags are coupled to a mechanical venturi or collar. The venturi or collar then twistably fits into the tabbed orifice, and the filter bag becomes locked into place when forcibly rotated within the orifice into engagement with the peripheral tabs.

Instead of the above-described twist-lock-mounted filter bags, it is often less expensive and therefore advantageous to use simpler snap-band-mounted filter bags. These designs include a deformable snap band that coaxially fits into a smoothly-rounded, tabless orifice.

Because snap-band-mounted filter bags are often more desirable than the twist-lock-mounted filter bags, and because many tube sheets are currently adapted for use with twist-lock-mounted filter bags, it would be advantageous to convert the orifices of tube sheets usable with twist-lock-mounted filter bags to orifices usable with snap-band-mounted filter bags. Unfortunately, tube sheets formed with tabbed orifices for mounting twist-lock filter bags are difficult to convert for use with snap-band-mounted filter bags. A tube sheet which is capable of mounting snap-band-mounted filter bags requires machining of very precisely-dimensioned laser-cut orifices into a metal plate with little room for error; therefore, an entirely new tube sheet with the tabbed orifices already cut therein must be installed to convert the twist-lock-type orifices to the snap-band-type orifices. Accordingly, modification of the orifices of the tube sheets is tedious and labor-intensive, often requiring gas torches to remove and replace sections and entire tube sheets and subsequent retrofitting of the converted tube sheets into place and seal welding of the converted tube sheets to the remainder of the baghouse filter system.

It is therefore advantageous to provide a machine for quickly converting tube sheet orifices of the locking-tab type to smooth, tabless orifices which are capable thereafter of receiving snap-bands for mating with less expensive filter bags and providing a better seal therebetween. It is further advantageous to provide a machine which does not require welding equipment or gas torches to effectuate the conversion of the orifices, thus eliminating the tedious and labor-intensive process of conversion described above.

SUMMARY OF THE INVENTION

It is therefore an object of embodiments of the present invention to provide an apparatus and method for converting twist-lock tube sheet orifices to snap-band tube sheet orifices to allow use of the less expensive and less labor-intensive snap-band filter bags in place of the twist-lock filter bags.

It is a further object of embodiments of the present invention to provide a conversion apparatus and method of the above-type which is relatively simple and not labor-intensive in use.

It is a further object of embodiments of the present invention to provide an apparatus and method of the above type which does not require removing the tube sheets from the baghouse filter system and replacing the tube sheets upon conversion of the orifices thereof, which is required when using the typical welding equipment or gas torches.

It is a further object of embodiments of the present invention to provide an apparatus and method for quickly, efficiently, and precisely removing one or more tabs within twist-lock tube sheet orifices using a machine to convert the twist-lock orifices into snap-band orifices capable of receiving snap-band-type filter bags.

It is yet a further object of embodiments of the present invention to convert twist-lock orifices into smooth, round orifices which provide a better, at least substantially airtight seal between the tube sheet and the filters when bag filters are installed to the tube sheet with snap bands.

It is also an object of embodiments of the present invention to provide a machine-powered system for converting twist-lock tube sheet orifices to snap-band tube sheet orifices.

Another object of embodiments of the present invention includes expediting the effective repair and replacement of one or more critical baghouse filter bags.

It is further an object of embodiments of the present invention to simplify the installation of snap-band-mounted baghouse filters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide a method and apparatus for converting twist-lock tube sheet orifices into snap-band receptive tube sheet orifices. Entire baghouse tube sheet orifice arrays may be converted with the powered apparatus so that less expensive bag filters of the snap-band-mounted type may be employed. The conversion machine of embodiments of the present invention, which is preferably hydraulically-operated, may be easily inserted into the tab-type orifice, rotated into position, and activated (preferably hydraulically activated, as described below). Upon activation of the machine, the twist-lock tab is forcibly removed, and a smooth, round orifice capable of mating with a conventional snap-band orifice (which may be, for example, a double-beaded snap-band orifice) results. Inexpensive snap-band-type filter bags may then be installed at each converted orifice to refurbish or repair the baghouse filter system.

In an embodiment of the conversion machine of the present invention, the machine includes hydraulic powering of a piston-driven bit which is capable of machining the orifice being converted. In this embodiment, a generally cylindrical hydraulic body is secured between rigid upper and lower platens, and a handle may optionally be located atop the machine to enable manual manipulation thereof. Threaded hydraulic fittings may connect suitable hydraulic hoses for operating the piston.

In operation of the preferred embodiment of the present invention, a power-driven tool engages the orifice to be converted. Radially spaced-apart, indented niches formed in the tool periphery provide clearance for the twist-lock tabs in the orifice to be converted. Radial twist slots machined into the tool bit are in communication with the clearance niches. Once the tool enters an orifice, subsequent twisting captivates the unwanted orifice, and the tabs are forcibly removed from the orifice due to the lack of clearance for the tabs when the bit is withdrawn from the orifice.

Figure 4:
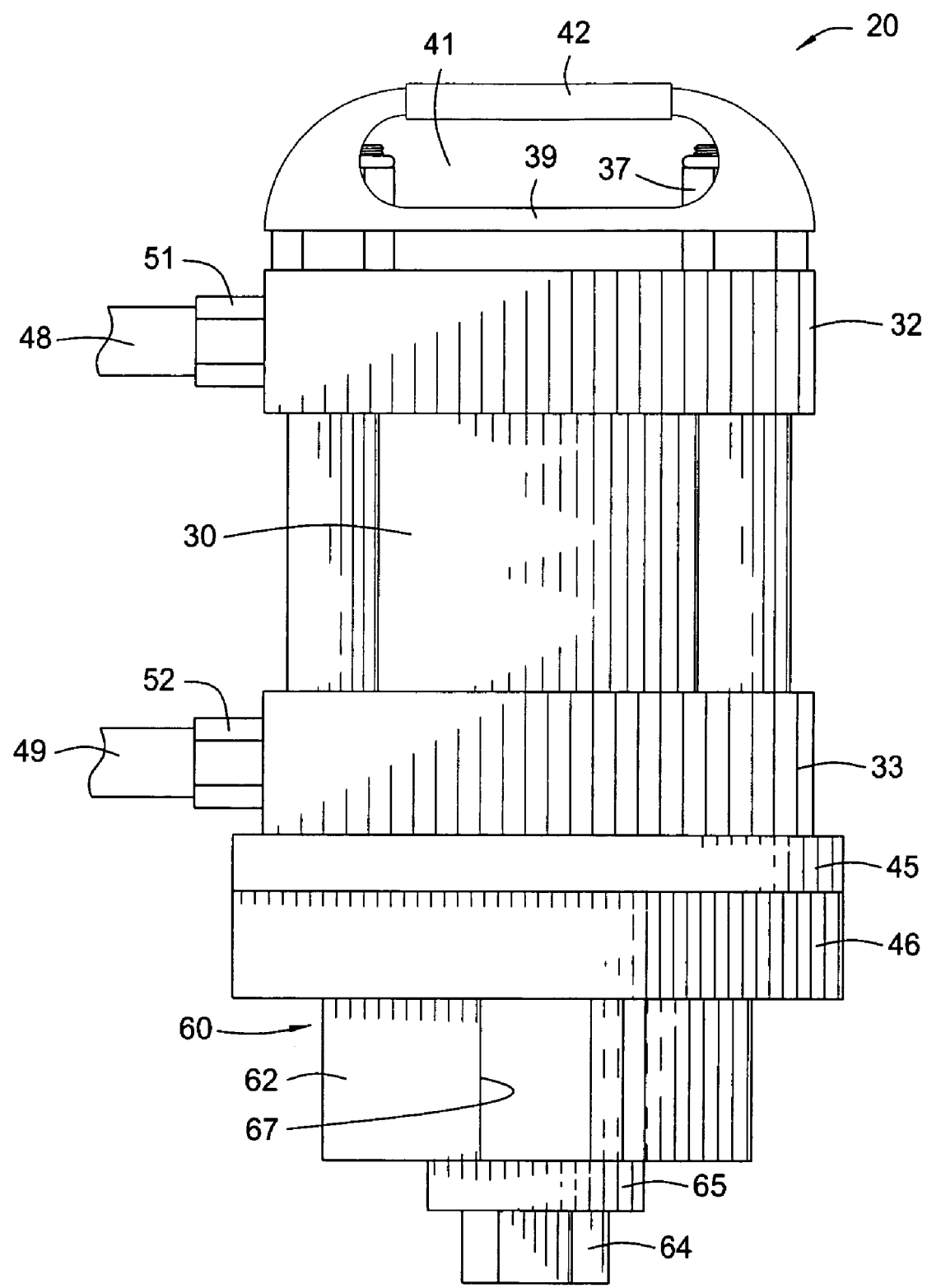
FIG. 4 is a side isometric view of the machine of FIG. 1.
Figure 5:
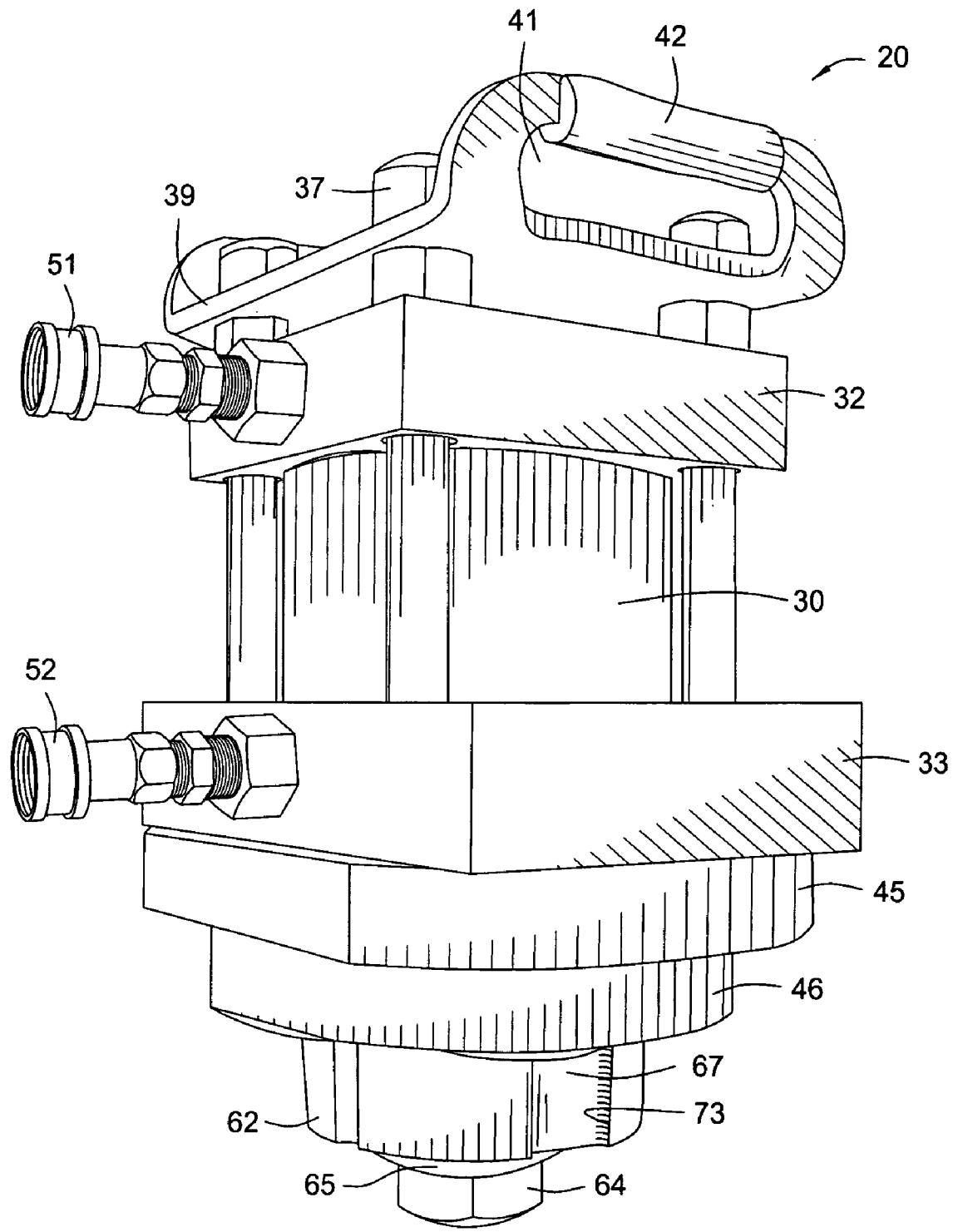
FIG. 5 is a bottom isometric view of the machine of FIG. 1.
Figure 6:
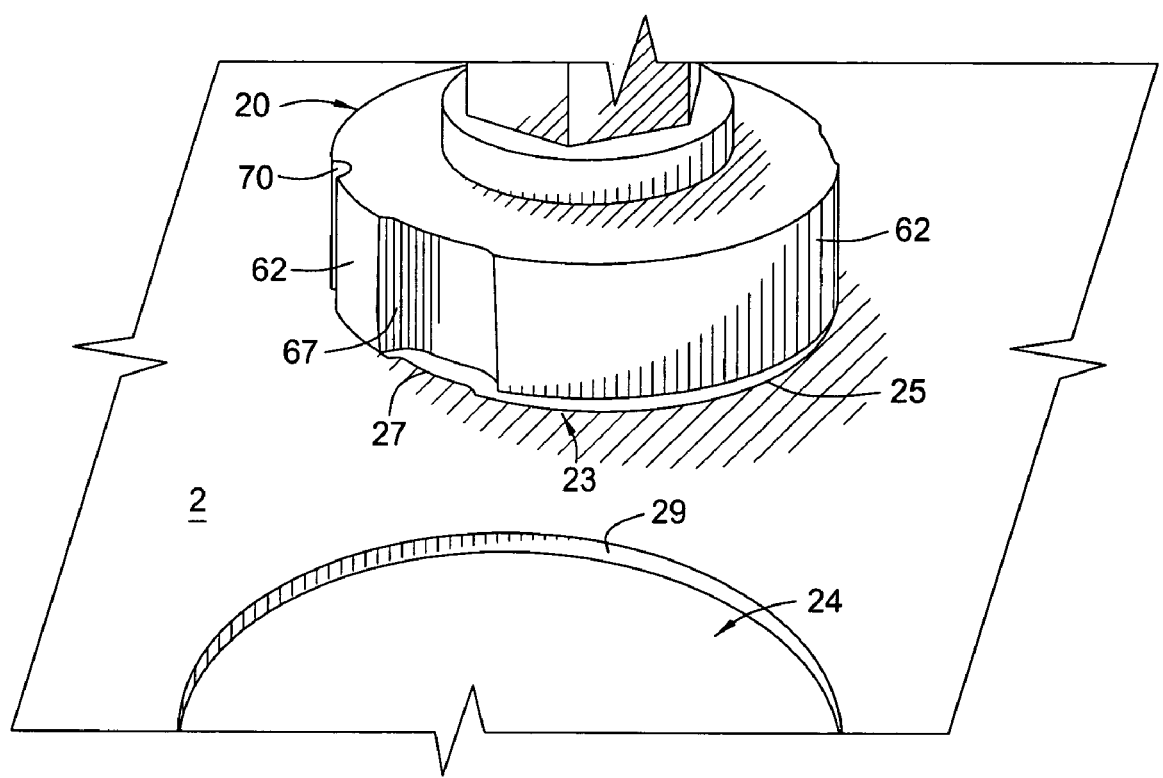
FIG. 6 is a top view of the machine of FIG. 1 being inserted into a twist-lock orifice for conversion thereof to a snap-band orifice.

FIGS. 1-5 illustrate various views of a conversion machine 20 for converting one or more twist lock orifices 23 within a tube sheet 2 into snap band orifice(s) 24, which process is partially shown in FIG. 6. Referring to FIG. 6, which illustrates the before and after significance of operation of the conversion machine 20, the tube sheet 2 of a baghouse filter system (not shown) includes a twist lock orifice 23 and a previously converted snap band orifice 24 disposed within the tube sheet 2. The twist-lock orifice 23 has a generally circular periphery 25 with one or more rigid, radially spaced-apart tabs 27 projecting towards the center of the periphery 25. The tabs 27 are integral with the tube sheet 2.

In a typical twist-lock orifice 23, the tabs 27 are employed to interlock with suitable collar or venturi hardware (not shown) that mounts certain baghouse filter elements (not shown) for a twist-lock-mounted bag filter (not shown). Tabs 27 obstruct the circumference of the orifice 23, thereby preventing the insertion of a conventional snap-ring (which may, for example, be a double-beaded snap-ring) used for mounting less expensive baghouse filters, such as snap-band-mounted filter bags. Such filters cannot be installed without removing the tabs 27 to create a generally round snap-band orifice 24 having a generally smooth circular periphery 29 unobstructed by irregular projections or tabs 27. The snap-band orifice 24 freely receives conventional snap bands (including, for example, double-beaded snap bands) as are known to those skilled in the art. Thus, the purpose of embodiments of the machine, generally, is to forcibly and mechanically convert one or more twist-lock orifices 23 to tab-less orifices 24 for snap-band mounting thereto.

Referring now to FIGS. 1-5, the conversion machine 20 includes a generally cylindrical body 30 extending between preferably rigid upper and lower platens 32 and 33, respectively. Preferably, although not necessarily, the cylindrical body 30 is a hydraulic cylinder. Each platen 32, 33 is operatively connected to the body 30, preferably using one or more fasteners such as bolts threadably mated to suitable nuts contacting the platen 32, 33. Preferably, four spaced-apart bolts and accompanying nuts are used to connect each platen 32, 33 to the body 30.

Disposed within the body 30 is a powering mechanism (not shown) for the machine 20. Preferably, the powering mechanism is a conventional hydraulic piston and cylinder mechanism, although the powering mechanism may instead be mechanical or electrically-based. In an alternate embodiment, the powering mechanism may be external to the machine 20.

Figure 1:
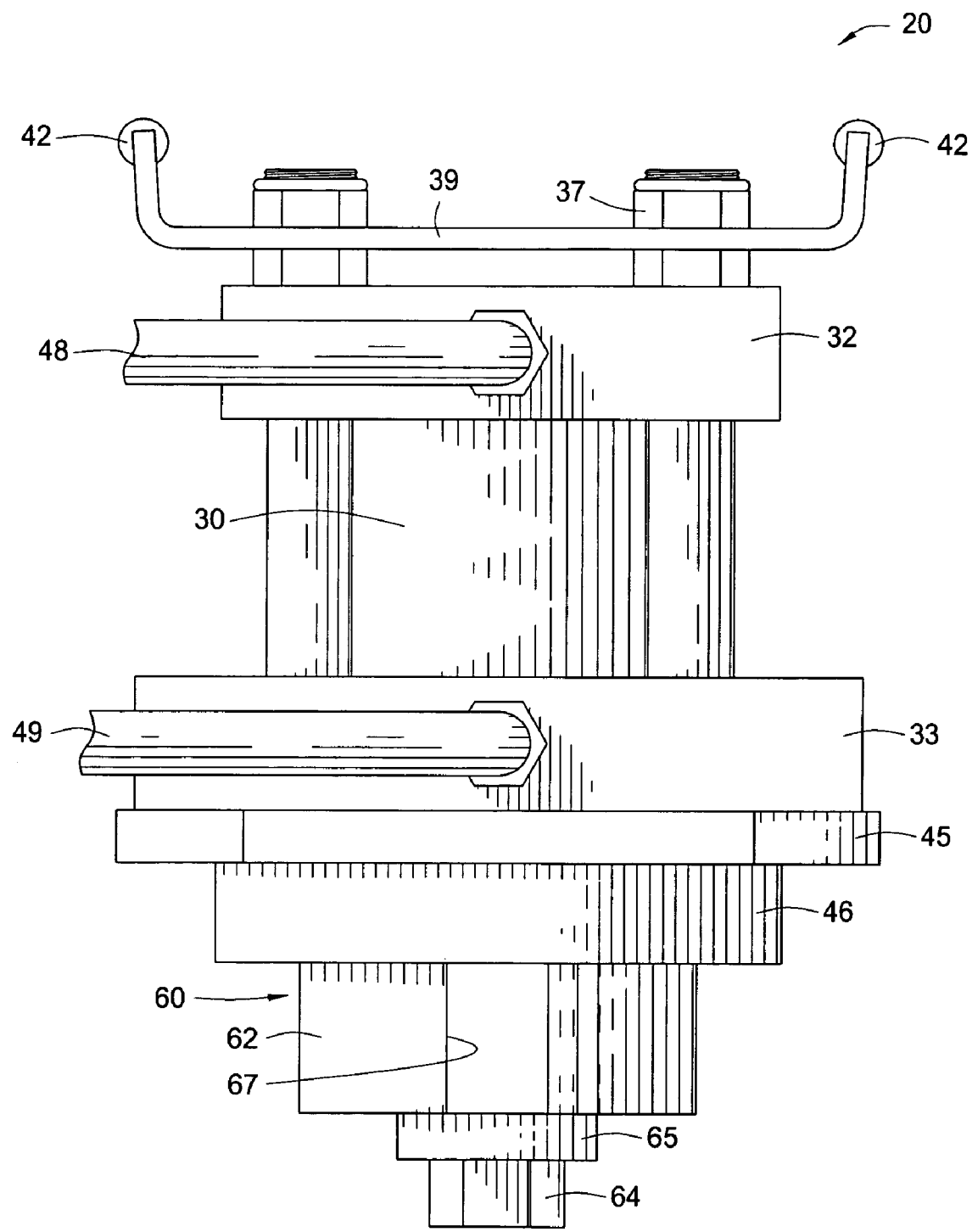
FIG. 1 is a front elevational view of a machine for converting twist-lock orifices to snap-band orifices.

Consistent with the hydraulic piston/cylinder mechanism powering of the machine 30, a first fitting 51 and a second fitting 52 are coupled to the upper platen 32 and the lower platen 33, respectively, as shown in FIG. 5, each fitting 51, 52 for receiving a separate hydraulic hose 48, 49 (see FIGS. 1 and 4). The fittings 51, 52 are preferably threaded for receiving threaded hydraulic hoses 48, 49, respectively, although any other connection method known to those skilled in the art is within the scope of embodiments of the present invention. When the hydraulic piston/cylinder mechanism is the powering mechanism, at least one external conventional hydraulic pumping apparatus powers machine 20 via hydraulic power supplied through hoses 48, 49.

Figure 2:
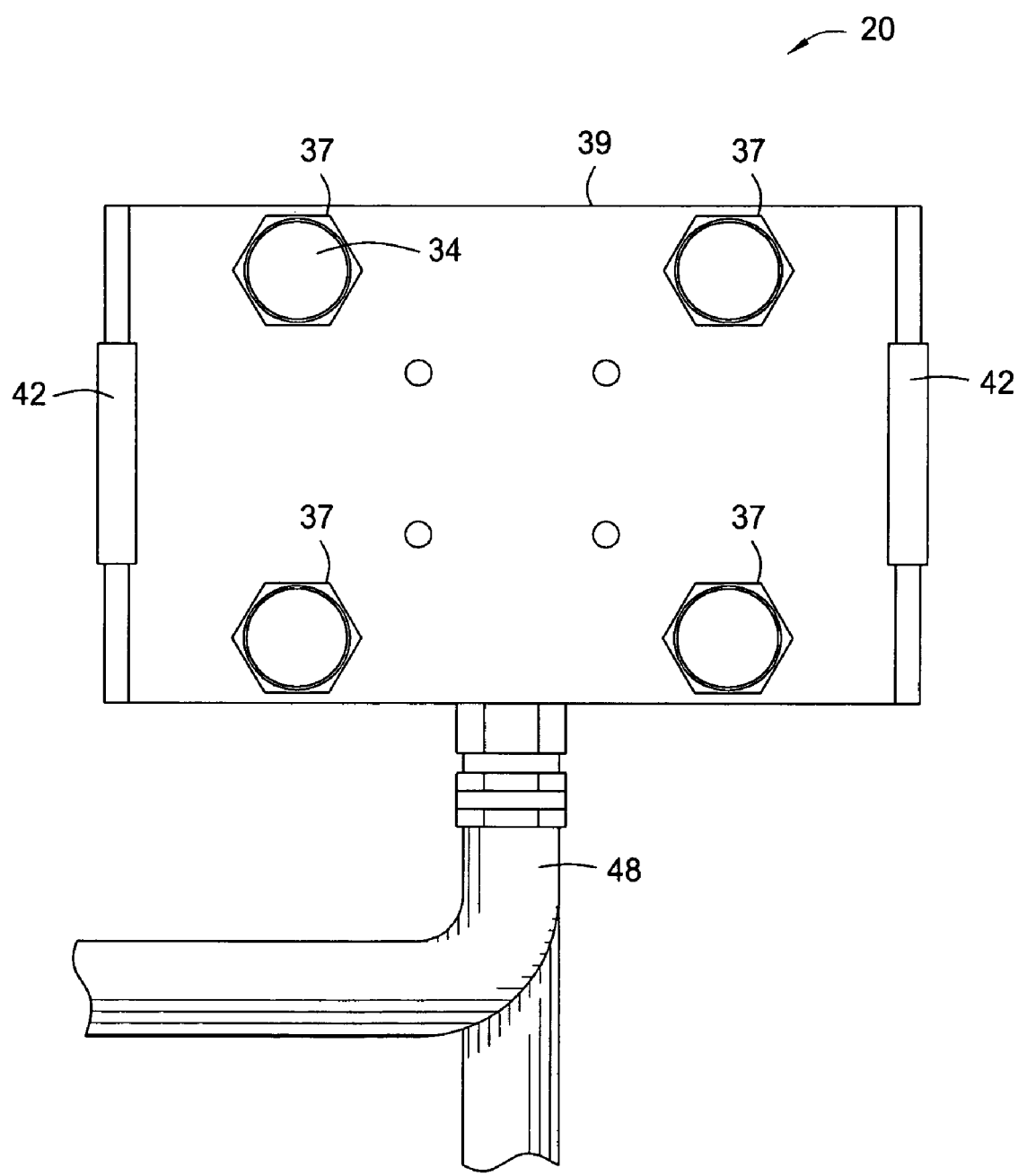
FIG. 2 is a top plan view of the machine of FIG. 1.

Referring now to FIGS. 1, 4, and 5, the upper platen 32 is operatively connected to a planar machine top 39, for example by one or more fasteners. The machine top 39 is preferably, although not necessarily, generally rectangular in shape. Preferably, the one or more fasteners are terminal nuts 37, as shown in FIG. 2, and most preferably four spaced-apart nuts 37 are utilized to fasten the upper platen 32 to the machine top 39.

The lower platen 33 is operatively connected to a spacer 45, as best shown in FIG. 5. For example, one or more fasteners, preferably one or more bolts 35, may be employed to secure the lower platen 33 to the spacer 45. The one or more bolts 35 are preferably four spaced-apart bolts 35. The hex-head 34 of each bolt 35 is seated within each pre-drilled recess defined in the underside of the spacer 45, and as a result the other parts of the machine 20 are securely tensioned. A circular collar 46 may be disposed beneath the spacer 45 and their centers generally aligned with one another.

Optionally, as best shown in FIGS. 4 and 5, one or more gripping handles are formed as an extension of the machine top 39 to facilitate carrying of the machine 20 with one or both of the user's hands. Most preferably, the machine top 39 extends into a u-shape upward at each end of the machine 20 to form two spaced-apart gripping handles substantially parallel to one another. Each gripping handle is formed by a slot 41 disposed within the upward extension of the machine top 39. Also optionally, one or more cushions 42 or other gripping devices may be disposed around each upper gripping portion of the machine top 39. In operation, if the optional gripping handles are included in the machine top 39, the machine 20 may be gripped and manipulated using the user's hands by grasping the gripping handles and inserting the user's fingers through the slots 41 around the sleeve-like cushions 42. It is also within the scope of embodiments of the present invention to include any other type of gripping handles in lieu of the machine top 39 and/or its integrated gripping handles.

Figure 3:
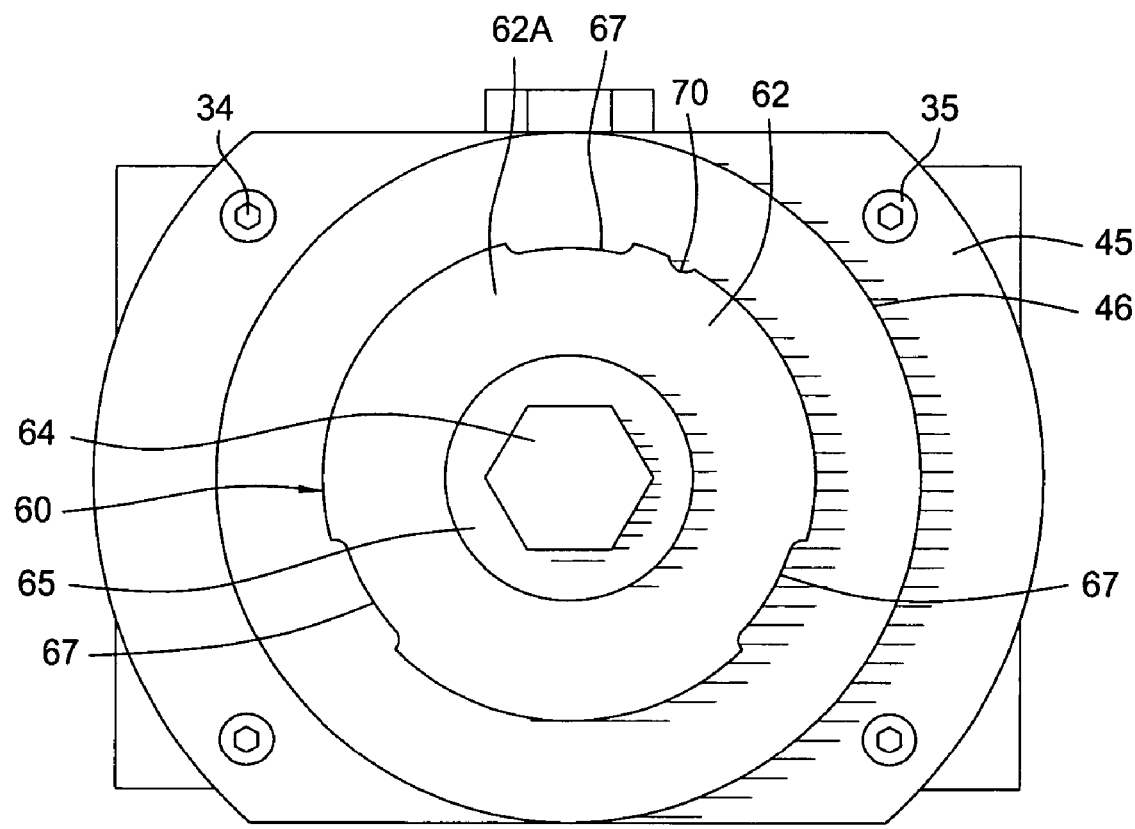
FIG. 3 is a bottom plan view of the machine of FIG. 1.

As depicted in FIG. 3, a cutting or shearing member, which is preferably a power-driven bit 60, is disposed beneath and at least substantially coaxial with the generally circular collar 46. The bit 60 is powered by the powering mechanism, preferably the hydraulic piston/cylinder mechanism disposed within the body 30. The power-driven bit 60 includes a generally circular machined tool 62 which is operatively connected to the internal hydraulic piston or ram by one or more fasteners, preferably a large bolt 64. A concentric washer 65 bearing against lower surface 62A of the tool 62 is pressed against the tool 62 by the hex-head of the bolt 64.

The tool 62 is preferably generally circular in profile, being generally annular or doughnut-shaped. A first portion of an outer diameter of the tool 62 is sized substantially the same as the inner diameter of the tube sheet orifices 23. A second portion of the outer diameter of the tool 62, however, includes one or more spaced-apart indentions in the form of one or more clearance niches 67 which enable the tool 62 to coaxially penetrate one or more twist-lock orifices 23 using the niches 67 to provide a clearing passageway for tabs 27. Although three clearance niches 67 are shown in FIGS. 1-6, it is understood that embodiments include any number of clearance niches 67 within the tool 62. Preferably, the number of clearance niches 67 equal the number of tabs 27, and the spacing of the clearance niches 67 from one another is at least approximately equal to the spacing of the tabs 27 from one another.

Optionally, one or more elongated, radial follower slots 70 may be machined into the tool 62 at or near its upward-facing side, preferably positioned at least substantially vertically adjacent to the collar 46. The slots 70 may extend into the clearance niches 67.

In operation, the machine 20 is grasped by the handle in its top 39 and positioned above the desired orifice 23 by aligning the tabs 27 with the clearance niches 67. When machine is lowered into the desired orifice 23 with the tabs 27 clearing niches 67 so that the collar 46 touches the floor of the tube sheet 2, subsequent twisting of the machine 20 positions the tabs 27 within the radial follower slots 70 so that each tab 27 to be removed finds itself slidably moved into each slot 70 immediately proximate to a radially spaced-apart knifing ledge 73 located at the closed end of each slot 70.

Upon actuation of the powering mechanism (preferably the conventional hydraulic piston/cylinder assembly), the bit 60 is forcibly withdrawn from the tube sheet orifice 23 to remove the twist-lock tabs 27 so that the clearance niches 67 no longer register with the twist-lock tabs 27. When the power bit 60 is lifted upwardly, clearance no longer exists for the tabs 27, as the knifing ledges 73 cut and tear out the unwanted tabs 27, leaving an at least substantially unobstructed generally circular orifice having a smooth inner circumference, such as orifice 24 shown in FIG. 6. That inner circumference is capable of smoothly accepting and interfitting with a snap band (for example, a double-beaded snap band) so that an outer groove of a snap band for a snap-band filter bag is capable of concentrically seating within and sealing with the converted tube sheet orifice.

Advantageously, the machine 20 is capable of removing all of the tabs 27 located within a tabbed orifice at one time, so that one upward movement of the machine 20 eliminates all of the tabs 27 (which may be, for example, three tabs) from the orifice and converts the twist-lock orifice to a snap-band orifice. The ability of the machine 20 to accomplish removal of all of the tabs 27 in one operation of the machine 20 provides a cost-effective, efficient, and precise method of converting the orifice from the twist-lock configuration to the snap-band configuration, even as the tube sheet remains within the baghouse filter system. The machine 20 converts the twist-lock orifice to the snap-band configuration with the laser-cut precision necessary to allow mounting of the snap-band filter bags to the converted orifice.

While the foregoing is directed to embodiments of the present invention, other and further embodiments of the invention may be devised without departing from the basic scope thereof, and the scope thereof is determined by the claims that follow.

The invention claimed is:

1. A method for converting a tabbed orifice of a tube sheet in a bag-house filter into a tab-less orifice without removing the tube sheet from the bag-house filter, the method comprising the steps of:

providing a conversion machine having a powering mechanism, the conversion machine shaped to accommodate one or more tabs within the tabbed orifice upon its insertion therein;

inserting at least a portion of the conversion machine into the tabbed orifice;

activating the conversion machine using the powering mechanism; and, removing one or more tabs from the tabbed orifice using the conversion machine.

2. The method of claim 1, wherein:

said step of providing a conversion machine comprises the step of providing a plurality of indentations disposed in an outer circumference of the conversion machine; and, said step of inserting at least a portion of the conversion machine into the tabbed orifice comprises the steps of fitting one or more of said indentations around the one or more tabs within the tabbed orifice.

3. The method of claim 2 wherein said step of activating the conversion machine using the powering mechanism comprises the step of moving the conversion machine upwardly relative to the tube sheet, and wherein said step of removing one or more tabs from the tabbed orifice using the conversion machine comprises the steps of cutting the one or more tabs from the orifice and removing them in response to the powering mechanism.

4. A method for converting a tabbed orifice of a tube sheet in a bag-house filter into a tab-less orifice without removing the tube sheet from the bag-house filter, the method comprising the steps of:

providing a conversion machine with a hydraulic powering mechanism, the conversion machine comprising a knifing portion comprising one or more circumferential indentations for clearing one or more tabs within the tabbed orifice upon its insertion therein;

inserting the knifing portion of the conversion machine into the tabbed orifice;

activating the machine with said powering mechanism with the knifing portion registering with said tabs; and, removing one or more tabs from the tabbed orifice with the knifing portion.

5. A method for converting a tabbed orifice of a tube sheet in a bag-house filter into a tab-less orifice without removing the tube sheet from the bag-house filter, the method comprising the steps of:

providing a conversion machine comprising a knifing portion comprising one or more circumferential indentations for clearing one or more tabs within the tabbed orifice upon its insertion therein;

powering said conversion machine with a hydraulic cylinder;

inserting the knifing portion of the conversion machine into the tabbed orifice such that the indentations clear the tabs;

activating the hydraulic cylinder with the knifing portion registering with said tabs; and, removing one or more tabs from the tabbed orifice with the knifing portion.

* * * * *